United States Patent
Broodney et al.

(10) Patent No.: US 10,136,280 B2
(45) Date of Patent: Nov. 20, 2018

(54) PARALLEL USER INTERACTION WITH PHYSICAL AND MODELED SYSTEM

(71) Applicant: International Business Machines Corporation, Armonk, NY (US)

(72) Inventors: Henry Broodney, Haifa (IL); Yael Dubinsky, Haifa (IL); Lior Limonad, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/249,497

(22) Filed: Aug. 29, 2016

(65) Prior Publication Data

US 2018/0063666 A1   Mar. 1, 2018

(51) Int. Cl.
| | |
|---|---|
| *H04L 29/08* | (2006.01) |
| *H04W 4/50* | (2018.01) |
| *H04W 56/00* | (2009.01) |
| *H04W 4/70* | (2018.01) |

(52) U.S. Cl.
CPC ............. *H04W 4/50* (2018.02); *H04W 4/70* (2018.02); *H04W 56/0015* (2013.01); *H04W 56/0025* (2013.01)

(58) Field of Classification Search
CPC ..... H04L 67/12; H04L 12/282; H04L 67/125; G05B 2219/2642; F24F 11/30; G05D 23/1902; H04W 4/70
See application file for complete search history.

(56) References Cited

U.S. PATENT DOCUMENTS

| | | | |
|---|---|---|---|
| 8,401,833 B2 | 3/2013 | Radibratovic et al. | |
| 9,031,824 B2 | 5/2015 | Nasle | |
| 2015/0192939 A1* | 7/2015 | Joo | G05B 15/02 700/277 |
| 2015/0248510 A1 | 9/2015 | Meagher et al. | |
| 2015/0248617 A1 | 9/2015 | Nasle | |
| 2016/0226732 A1* | 8/2016 | Kim | H04L 12/2807 |
| 2016/0241566 A1* | 8/2016 | Khurana | H04L 63/102 |
| 2016/0284207 A1* | 9/2016 | Hou | H04L 67/125 |
| 2016/0327921 A1* | 11/2016 | Ribbich | F24F 11/30 |
| 2018/0013579 A1* | 1/2018 | Fairweather | H04L 12/40032 |

OTHER PUBLICATIONS

Jan Peleska., "A Real-World Benchmark Model for Testing Concurrent Real-Time Systems in the Automotive Domain", Testing Software and Systems, vol. 7019 of the series Lecture Notes in Computer Science pp. 146-161, 2011.

* cited by examiner

*Primary Examiner* — Dung Hong
(74) *Attorney, Agent, or Firm* — Ziv Glazberg (57) ABSTRACT

A computer-implemented method, computerized apparatus and computer program product for supporting parallel user interaction with physical and modeled system. A computerized digital model representing a real world physical system is obtained. An indication of a physical component of the system being subject to engagement by a user is received. A model component corresponding to the physical component is automatically determined. An interaction of the user with the model component is controlled based on at least one of the model and data obtained through engagement with the physical component.

20 Claims, 3 Drawing Sheets

PARALLEL USER INTERACTION WITH PHYSICAL AND MODELED SYSTEM

TECHNICAL FIELD

The present disclosure relates to computer modeling and simulation in general, and to supporting parallel user interaction with a real world physical system and a computerized digital model thereof, in particular.

BACKGROUND

Various industries concerning field service employ a business infrastructure that is composed of some combination of business assets, machinery (e.g., sensors, actuators, or the like), data, and the relationship among them. Such infrastructure can be described at different levels of abstraction, optionally in a digital form representation, which is referred to in the context of the present disclosure as the "system model", or the "model", in short. For example, in Energy companies, the power flow grid may commonly be referred to as a core part of the model; or in Smart Cities, it may be the public illumination grid referred to as the model, and so on. Regardless of the particular business domain, the model itself is usually maintained using some computerized information means, i.e. Information Systems (IS) that are in the veins of the business operations. Hence, having a faithful representation of the actual business situations in the real world, as depicted by the model, and at all times, may prove critical to operational efficiency.

BRIEF SUMMARY

One exemplary embodiment of the disclosed subject matter is a computer-implemented method comprising: obtaining a model representing a system, wherein the model is a computerized digital model, wherein the system is a real world physical system; receiving an indication of a physical component of the system being subject to engagement by a user; automatically determining a model component corresponding to the physical component; and controlling an interaction of the user with the model component performed via a mobile device operated by the user based on at least one of the model and data obtained through engagement with the physical component.

Another exemplary embodiment of the disclosed subject matter is a computerized apparatus having a processor, the processor being adapted to perform the steps of: obtaining a model representing a system, wherein the model is a computerized digital model, wherein the system is a real world physical system; receiving an indication of a physical component of the system being subject to engagement by a user; automatically determining a model component corresponding to the physical component; and controlling an interaction of the user with the model component based on at least one of the model and data obtained through engagement with the physical component.

Yet another exemplary embodiment of the disclosed subject matter is a computer program product comprising a non-transitory computer readable storage medium retaining program instructions, which program instructions when read by a processor, cause the processor to perform a method comprising: obtaining a model representing a system, wherein the model is a computerized digital model, wherein the system is a real world physical system; receiving an indication of a physical component of the system being subject to engagement by a user; automatically determining a model component corresponding to the physical component; and controlling an interaction of the user with the model component based on at least one of the model and data obtained through engagement with the physical component.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to promote the practice of field service practitioners and crews, by providing on-the-job interaction between what they encounter in the physical world and what they expect based on information provided by an operations center.

Another technical problem dealt with by the disclosed subject matter is to overcome the challenging and cumbersome task of keeping organizational information systems up to date in the corresponding operational systems.

Yet another technical problem dealt with by the disclosed subject matter is to provide for a systematic interaction protocol to enable bi-directional knowledge transfers between daily encounters in the physical world and back-end business operations.

A study entitled: D. a. Norman, "Cognitive Engineering," *User Centered Syst. Des.*, pp. 31-61, 1986 (hereinafter "Norman"), which is hereby incorporated by reference in its entirety without giving rise to disavowment, theorizes about the 'Gulfs of Execution' and the 'Gulf of Evaluation' associating human goals with the physical system they interact with. According to Norman, the former transitions from goals to physical system and the latter in the opposite direction from the physical system to the goals. In short, the gulf of execution is the difference between the intentions of the users and what the system allows them to do or how well the system supports those actions. The gulf of evaluation is the difficulty of assessing the state of the system and how well the artifact supports the discovery and interpretation of that state. In the context of the present disclosure, the gulfs to be dealt with are thus between the goals and intentions of the field engineers per their encounter in the real world and the system's model.

One technical solution is to employ a model-centric approach, wherein interaction between real-world encounters and back-end operations is driven by an underlying computer-based model of the physical system in question, serving as a "boundary object". The term "boundary object" is to be understood in the context of the present disclosure as referring to a notion of an entity that is shared by different communities of practice and which may be interpreted or used by each community in a different way. The purpose of the boundary object is to facilitate cross-functional and cross-organization communication and coordination. This makes the boundary object itself an interface among these communities. The general concept of boundary object is discussed in: S. L. Star and J. R. Griesemer, "Institutional ecology, 'translations' and boundary objects: Amateurs and professionals in Berkeley's Museum of Vertebrate Zoology, 1907-39," *Soc. Stud. Sci.*, vol. 19, no. 3, pp. 387-420, 1989, which is hereby incorporated by reference in its entirety without giving rise to disavowment.

In some exemplary embodiments, a set of fundamental interaction operation types that can be performed by crewmembers as well as by other non-digital or digital actors alike, such as control center operators, operational systems, and/or application programs, may be provided. For example, the set may be consisted of the following illustrative four categories of operations: (1) VIEW—allowing practitioners to inquire about the characteristics of a certain model component in real-time while engaging with the corresponding component in the physical world; (2) RECORD—enabling practitioners to document the knowledge gathered along physical encounters with a certain model component, while in the field in a timely manner. Such knowledge may be gathered by associating model components with various means such as photos, textual annotations, note scans, or the like; (3) VALIDATE—providing practitioners with the ability to test different "what-if" scenarios that refer to a certain physical component, and examine, on the model itself, the possible outcomes of the alternative actions prior to their actual pursuing; (4) UPDATE—allowing practitioners to modify existing knowledge properties already recorded about model components in the operational systems based on encounters with these components in the physical world, while conforming to the approval and related governance mechanisms associated with such modifications. It will be appreciated that these categories may be thought of as counterparts to the four basic functions of relational databases, namely, create, read, update, and delete (CRUD). Such CRUD-like operations may be employed in the context of system model's usage in accordance with the disclosed subject matter, particularly as a means to systematically support the interaction between field service practitioners and the business operations.

Another technical solution is to utilize an application program configured for executing on a mobile device operated by a user (e.g. a field engineer, technician, or the like), whereby interaction with an underlying model during engagement with the represented physical system is facilitated, in order to support actions performed by the user in the physical world, specifically while on field service. The parallel interaction in the real and virtual world may thus provide assistance to the user in decision making, e.g. as to which actions are to be taken for achieving a desired goal, help to improve compatibility of the model to the physical world, e.g. for servicing further or subsequent interactions, and so forth. The mobile device may be, for example, a laptop, handheld or tablet computer, a cellular phone (e.g. smartphone), a personal digital assistant (PDA), or the like. The mobile device's designated application program (hereinafter "mobile app") may provide access to the model in either an online or offline manner. The model may be accessible by the mobile app via a computer network, such as the Internet, for example, whereby a plurality of computing devices, including those mobile as well as stationary ones, may access the model also. The mobile app may be integrated in a system which the core functionality thereof is to synchronize between the various model views. This may include enabling situation-relevant information projections as required for the different tasks performed by the field engineers. Additionally or alternatively, this may include propagating information about these practitioners' actions in field to the corresponding back-end systems to ensure their timely updating. The front-end mobile app may be aimed to facilitate the various tasks per the actual context in which they are performed, allowing field workers to easily alter between various aspects of interest (e.g., related model overlays), and to record all their actions within the actual context in which they are performed, i.e. the corresponding model fragment. For example, a field practitioner or crew may mark failures or outages, indicate measurements or record flaws, modify status or information, or the like.

In some exemplary embodiments, automatic or semi-automatic determination of the individual model component against which each operation is pursued (i.e., the 'context' of the operation), may be enabled. The context may be determined by a parameter or combination of parameters such as location, time, identification code, physical quantity (e.g. temperature, pressure, humidity, radiation, or the like) being measured by sensors deployed on-site, or the like. In some exemplary embodiments, the mobile device of the user may be equipped with one or more sensors, such as, for example, a Global Positioning System (GPS) receiver, an imaging sensor (e.g., a camera, a scanner, or the like), a sound detector (e.g., a microphone), an accelerometer, a Radio Frequency (RF) transceiver, or the like. These sensors may be utilized by the device for capturing information indicative of a physical component that is being engaged by the user, whereby the model component corresponding thereto may be determined. For example, model components may be mapped to physical locations of their corresponding physical components, identifiable using a location service of the mobile device (e.g., GPS). Additionally or alternatively, various physical components may bear identification markings (e.g., barcode, Quick Response (QR) code, serial number, or the like) or Near Field Communication (NFC) means (e.g., a Radio Frequency Identification (RFID) tag), that may be detected and decoded by suitable means, e.g., using image or character recognition. It will be appreciated that additional or other means apart from sensors may be utilized by the location service, such as Wi-Fi Positioning System (WPS) or WiPS/WFPS, Cellular Network Search, and likewise mobile positioning techniques. The mobile device may be configured to communicate with other devices, such as locally deployed sensors, where applicable, for obtaining the indication of the respective physical component therefrom.

One technical effect of utilizing the disclosed subject matter is to allow, by putting the relevant model in the center and focusing on the interaction therewith, that various operations performed by independent practitioners are all synchronized with the model as the central point of truth, namely as the boundary-object. Thus, model accuracy may be kept at all times, and indirectly, the model itself becomes centric to the synchronization of all other business operations. Using the model as the baseline, all other aspects pertaining to the business supply chain and operations can be put in concert with it. For example—work order prioritization, asset management, etc. Via the model being a faithful depiction of the physical world, all other aspects can easily remain in congruence with one another, eliminating inconsistencies across the different aspects. As a result, grid downtime may be reduced and consequently quality of service to the customer can improve. Furthermore, this allows practitioners to rely upon the operational tier in order to obtain relevant analytics and real-time data, and to employ predictive business intelligence (e.g., via what-if scenarios and simulation views) to be advised of optimal ways of action.

It will be appreciated that previous work, such as: A. Burton-Jones, R. Weber, and Y. Wand, "Guidelines for Empirical Evaluations of Conceptual Modeling Grammars," *J. Assoc. Inf. Syst.*, vol. 10, no. 6, pp. 495-532, 2009; and, M. I. Aguirre-Urreta and G. M. Marakas, "Comparing Conceptual Modeling Techniques!: A Critical Review of the EER vs. OO Empirical Literature," *DATA BASE Adv. Inf. Syst.*, vol. 39, no. 2, pp. 9-32, 2008, which are hereby incorporated by reference in their entirety without giving rise to disavowment, only investigated the interaction with the model via the intrinsic characteristics of the model itself (i.e., its grammar qualities), and have not dealt with the model surface aspect or the foundations of the interaction with the model, in contrast to the disclosed subject matter.

Another technical effect of utilizing the disclosed subject matter is to cut losses by facilitating more efficient maintenance of the model.

Figure 1:
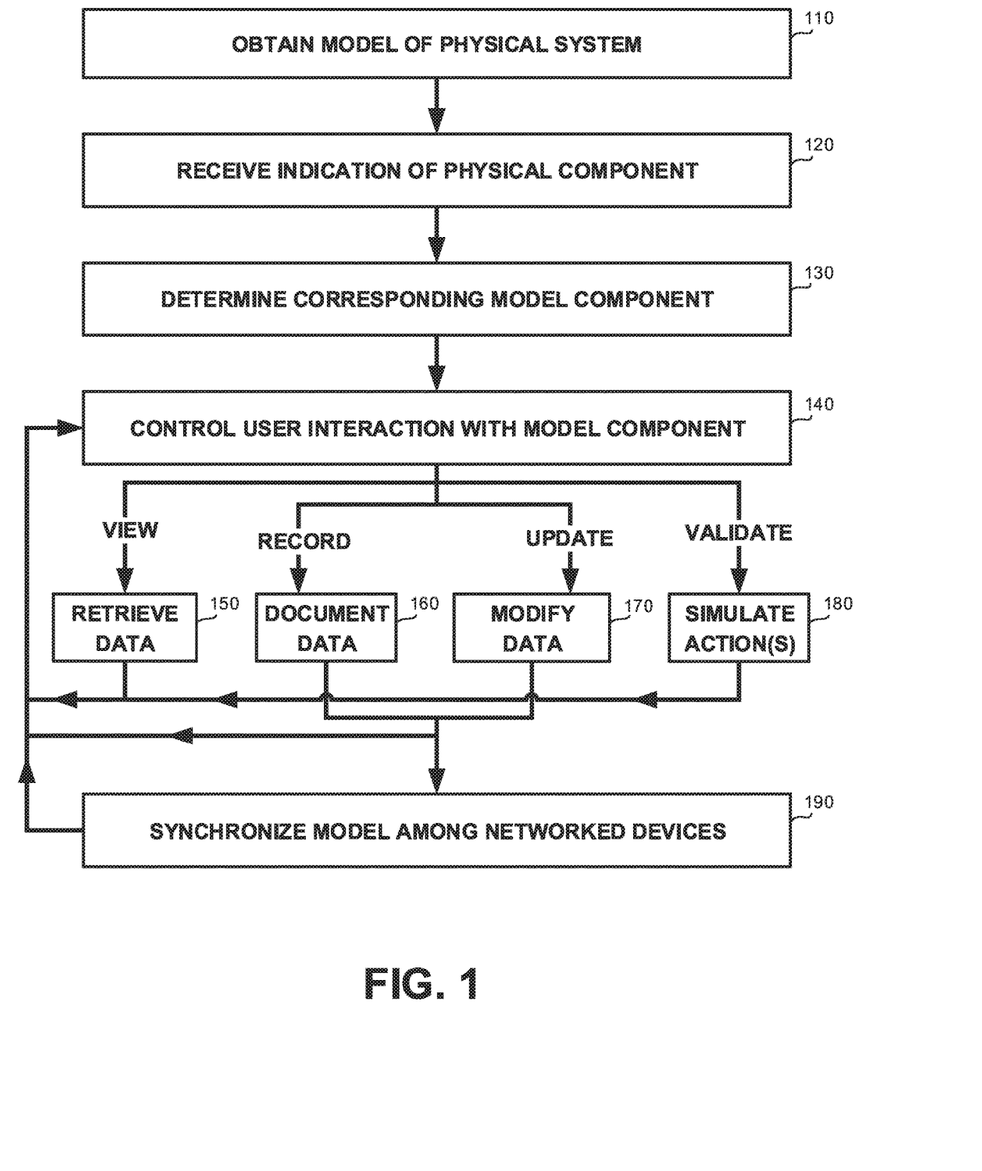
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the subject matter.

On Step 110, a model of a physical system may be obtained, wherein the model may be a computerized, digital model, and the physical system may be a real world system, such as, for example, an infrastructure of an enterprise, comprising a plurality of assets, whether tangible (e.g., real estate, machinery, workforce) or intangible (e.g., human capital, intellectual property, finance), as well as other equipment (e.g., sensors, monitoring and control units, communication channels), data, relationships or hierarchy among different entities of the infrastructure, or the like. In some exemplary embodiments, the model may be provided in an articulated form, such as, for example, a knowledge base. The model may be stored in an organizational repository accessible via any acceptable communication network, such as, for example, the Internet. Additionally or alternatively, the model or some parts of it may be stored locally on a mobile device operated by a user, for providing offline access thereto.

On Step 120, an indication of a physical component of the system modeled by the model obtained on Step 110, which physical component is currently being or expected to be engaged by a user, e.g. a field service technician or crew, may be received. The indication may be received through its capturing by one or more sensors of the mobile device, e.g., a visual indication recorded by camera, an audial indication picked up by a microphone, an electrical indication detected by an electromagnetic sensor, a spatial indication obtained by a GPS receiver or likewise geo-location service, a gravitational indication measured by an accelerometer, or the like. The indication may further comprise or be a temporal indication received from a clock of the mobile device or another device, such as a time of day or the like. Additionally or alternatively, the indication may be provided by a user inputting manually an identifier of the physical component, e.g. a serial number or other character sequence, which may optionally be presented on the component itself or in its vicinity. In some exemplary embodiments, the indication may be obtained by one or more external or stand-alone sensors which may be deployed on site, e.g. at the location of the physical component, and be then conveyed to a mobile device of a user and/or another computing device being in communication therewith.

On Step 130, a model component corresponding to the physical component indicated on Step 120 may be determined automatically. The determination may be made using a corresponding mapping between the various components of the physical system and components of the model representing the same. The mapping may utilize information encoded in the indication as a key or index to the respective value entry. For example, the indication may comprise a code, such as a barcode or a QR code, or identification data encoded in an RFID tag or other NFC means, or the like. Additionally or alternatively, the determination or decoding of information respectively may be performed using image or character recognition techniques. In some exemplary embodiments, the model may comprise multiple overlays which a user may alternate therebetween. The user may be presented with a default or pre-set overlay of the model component as determined, and may be able to navigate to one or more other overlays by choice, via a User Interface (UI) of the mobile device.

On Step 140, an interaction of a user with the model component determined on Step 130 may be enabled and controlled based on at least one of: the model, i.e. rules, parameters, constraints, data, and/or any properties or attributes embodied therein; and, physical data gathered through user engagement with the physical component indicated on Step 120. The interaction may comprise an operation or sequence of operations belonging to one of the following types: VIEW, RECORD, UPDATE, and VALIDATE. VIEW operations may allow a user to study or investigate existing knowledge in the model about the model component, where concerning data may be retrieved from the model for this purpose on Step 150. The information of interest, e.g. one or more characteristics of the model component, may be displayed or otherwise output to the user by the mobile device, e.g. using vocal and/or tactile indications or the like. RECORD operations may allow a user to add knowledge gathered during the real world encounter with the physical component to the model component, such as state or status update, malfunctions report, required action items, or the like. The data may be obtained using one or more sensors of the mobile device, e.g. photos, sound recordings, geographical coordinates, or the like. Additionally or alternatively, a user may input data gathered into the mobile device, e.g. by typing notes, drawing annotations, toggling menu options, or the like. The data may be documented accordingly with respect of the model component on Step 160. UPDATE operations may allow a user to edit, i.e. change or delete outdated or incorrect data previously recorded in association with the model component. The data may be modified accordingly on Step 170. VALIDATE operations may allow a user to explore effects of one or more possible courses of action that can be taken in the real world with respect to the physical component, using the model for simulation thereof on Step 180.

On Step 190, the model comprising data gathered during engagement of a user with the physical component, and incorporated into the model component during interaction performed on Step 140, e.g. by RECORD and/or UPDATE operations on Steps 160 and/or 170, respectively, may be synchronized among a plurality of computing devices being connected to a communication network via which the model may be accessed by any one of them. Step 190 may be performed simultaneously or subsequently to either Step 160 or 170, or deferred to a later stage, e.g. following a sequence of operations comprising one or more RECORD and/or UPDATE operations, or a combination thereof, for example.

Figure 2:
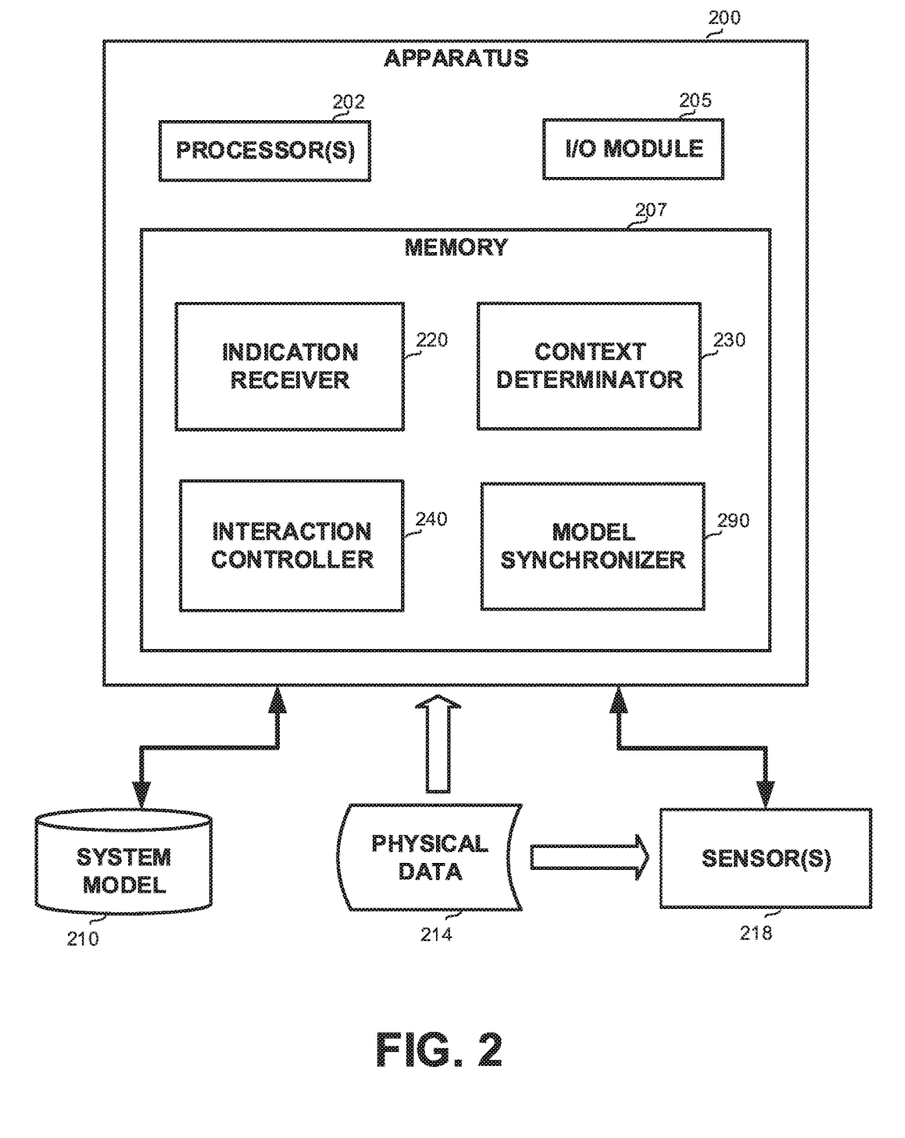
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An Apparatus 200 may be configured to support parallel user interaction with a real world physical system and a digital representation thereof, in accordance with the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user, such as, for example, display model components, record physical data, simulate user actions, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

In some exemplary embodiments, Apparatus 200 may comprise or be in communication with a System Model 210. System Model 210 may be a computerized digital representation of a real world physical system. Apparatus 200 may be adapted to obtain Physical Data 214 gathered or generated in connection with user engagement with the real world physical system being modeled by System Model 210. The Physical Data 214 may be obtained by Apparatus 200 either by way of user input or utilizing one or more Sensor(s) 218. Sensor 218 may be comprised in Apparatus 200 or be external and/or stand-alone devices coupled thereto or communicable thereby.

Indication Receiver 220 may be configured to receive an indication of a physical component being subject to engagement by a user, similarly as in Step 120 of FIG. 1. In some exemplary embodiments, Indication Receiver 220 may be configured to receive an indication comprising or based on Physical Data 214, as obtained by Sensor 218 or otherwise, e.g. inputted by a user, relayed from a communication network to which Apparatus 200 may be connected, or the like.

Context Determinator 230 may be configured to determine a model component of System Model 210 corresponding to the physical component for which an indication is received by Indication Receiver 220, similarly as in Step 130 of FIG. 1. Context Determinator 230 may determine the model component using a mapping between the received indication, or identification information comprised therein, and the model component. In some exemplary embodiments, Context Determinator 230 may be configured to extract such information from the received indication using a pattern recognition process, decoding mechanism, or likewise techniques.

Interaction Controller 240 may be configured to control an interaction of a user with the model component determined by Context Determinator 230, similarly as in Step 140 of FIG. 1. Interaction Controller 240 may control the interaction based on at least one of the System Model 210 and Physical Data 214. Interaction Controller 240 may be configured to retrieve, document and/or modify data of System Model 210, as well as utilizing System Model 210 to simulate possible scenarios arising from real world user actions, similarly as in Steps 150 to 180, respectively. The data documented and/or modified by Interaction Controller 240 may comprise or be based on Physical Data 214, whether obtained through Sensor(s) 218 or otherwise.

Model Synchronizer 290 may be configured to synchronize System Model 210, as affected by an interaction of a user therewith controlled by Interaction Controller 240, among a network of a plurality of computing devices in a communication with Apparatus 200, similarly as in Step 190 of FIG. 1. Model Synchronizer 290 may perform synchronization of System Model 210 concurrently with the interaction being enabled by Interaction Controller 240 or after its conclusion.

Figure 3:
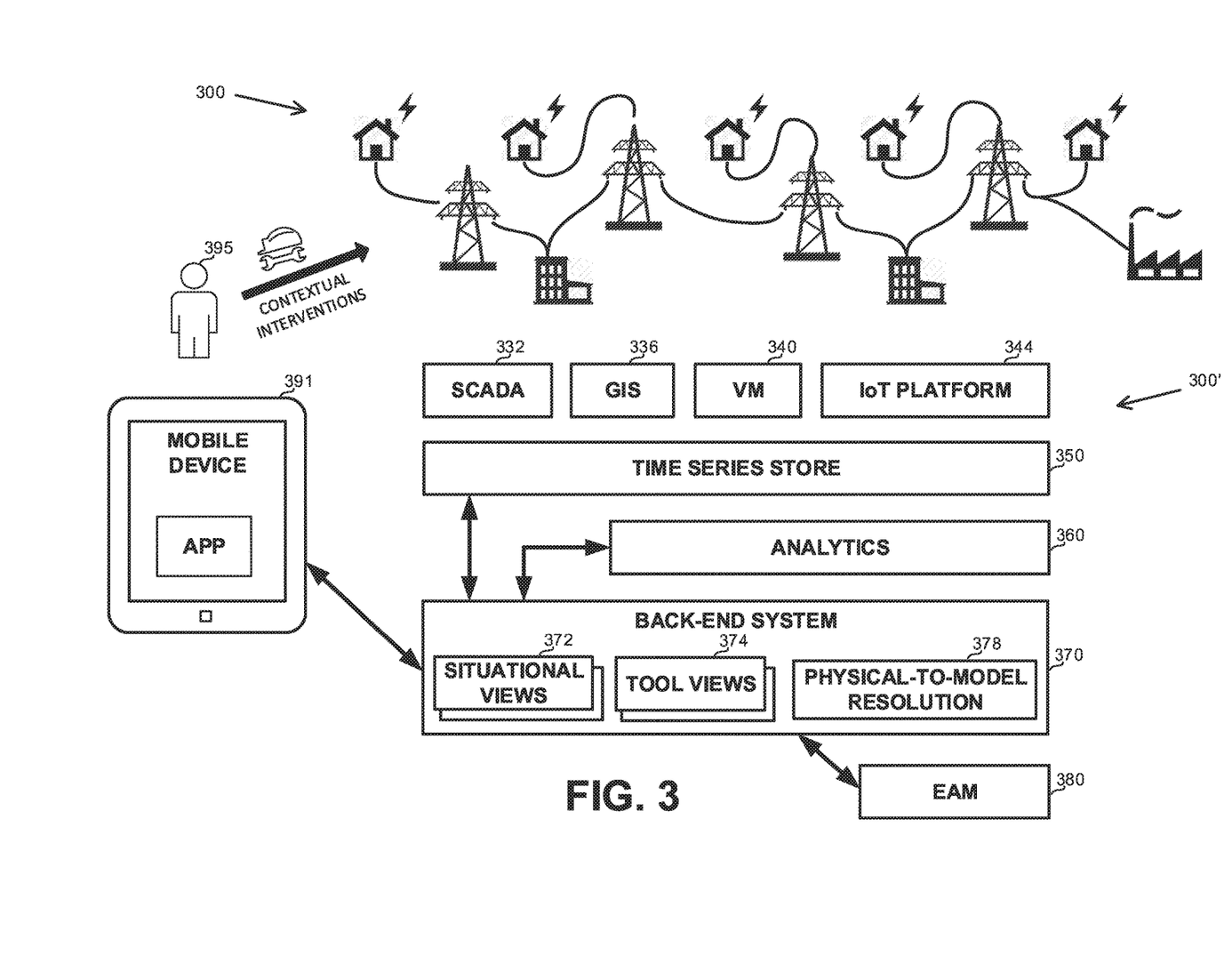
FIG. 3 shows a schematic illustration of an exemplary environment and architecture in which the disclosed subject matter may be utilized, in accordance with some exemplary embodiments of the disclosed subject matter.

Referring now to FIG. 3 showing a schematic illustration of an exemplary environment and architecture in which the disclosed subject matter may be utilized, in accordance with some exemplary embodiments of the disclosed subject matter. It will be appreciated that the architecture depicted in FIG. 3 is shown from a high-level perspective for illustrative purposes only and is not meant to be exhaustive or limiting in any manner.

A real world physical system, such as an Electricity Grid 300, may be digitally represented by a computerized model, such as System Model 210 of FIG. 2. Electricity Grid 300 may be coupled with a Computerized Platform 300', which may comprise or be in communication with various systems and/or devices configured for acquiring physical data information concerning Electricity Grid 300, such as, for example: a Supervisory Control And Data Acquisition (SCADA) 332 system configured for remote monitoring and control of industrial, infrastructure, and/or facility-based processes; a Geographical Information System (GIS) 336 configured for capturing, analyzing and presenting spatial or geographical data of desired types; or the like. Computerized Platform 300' may include or utilize one or more computer resources or management services, such as, for example: Virtual Machine (VM) 340 services, e.g. Amazon Machine Image (AMI)™ available from Amazon Web Services, configured for providing general-purpose processing capabilities; Internet-of-Things (IoT) Platform 344 services, e.g. Watson IoT Platform™ available from International Business Machines (IBM) of Armonk N.Y., USA, configured for managing IoT devices; Time-Series Store 350 services, such as Informix™ by IBM, configured for storage of time-series data sequences indexed in a temporal ordering, e.g. data gathered by SCADA 332 and/or GIS 336; Analytics 360 services for analysis of data relating Electricity Grid 300, e.g. geo-locations, load and/or voltage data; or any likewise services.

Back-End System 370 may be configured for supporting synchronization between Electricity Grid 300 and the computerized model representing the same. Back-End System 370 may comprise a plurality of Situational Views 372 relating to particular components or fragments of the computerized model, a plurality of Tool Views 374 relating to one or more utilized services, such as Time-Series Store 350 or Analytics 360, a Physical-to-Model Resolution 378 mapping for resolving contexts of field service intervention operations performed with respect to Electricity Grid 300, and/or any likewise support functionalities and components.

In some exemplary embodiments, Back-End System 370 may utilize an Enterprise Asset Management (EAM) 380, such as Maximo™ by IBM, comprised by Computerized Platform 300' and being configured for management of organizational assets, e.g. components of Electricity Grid

300. Back-End System 370 may be further configured for exchanging data with an application program (app) executing on a Mobile Device 391 operated by a User 395, e.g. a field practitioner or crew member required to perform intervention operations on Electricity Grid 300, whereby context for the intervention may be provided to User 395 while on the field. It will be appreciated that Mobile Device 391, as well as Back-End System 370, may be an apparatus such as Apparatus 200 of FIG. 2.

In some exemplary embodiments, Situational Views 372 and/or Tool Views 374 may be configured to enable model fragmentation. For example, Situational Views 372 may comprise different system views, such as electricity poles, lines, connectors, transistors, map view, or the like. Similarly, Tool Views 374 may be configured to accommodate for various types of front-end devices, such as Mobile Device 391, whether the device at hand is a tablet computer such as an iPad™ by Apple Inc., a cellular telephone such as an iPhone™ by Apple Inc., or the like. In some exemplary embodiments, Physical-to-Model Resolution 378 may be a server-side realization for all or portions of the plurality of computerized and/or mobile devices configured to support parallel user interaction such as Apparatus 200 of FIG. 2.

Use Cases

For illustrative purposes, two exemplary representative yet un-exhaustive use cases of the disclosed subject matter, based on processes in Energy services, are hereinafter described in detail. Within the domain of Energy and Utilities, quality of service may be a key to the success of the domain suppliers. Maintaining consistent and valid view of operations may be crucial both for business efficiency and for end user satisfaction. One such view may be the Connectivity model, which is a model representing the various electricity power sources, distributors, transformers, consumers, and their inter-connecting power lines, all comprising the electricity grid. The Connectivity model may be the main working tool ('boundary object') according to which all maintenance and restoration activities may be derived. It will be appreciated that insufficient availability of technical means that would facilitate and ensure the faithfulness and timely representation of the real system status, may potentially lead to excessive downtime and monetary losses.

The disclosed subject matter may be utilized at mitigating the burden of consciously maintaining model accuracy, bridging between the physical and the virtual model views via a designated mobile application that may be put in the hands of field engineers to seamlessly keep track of their day-to-day actions. Granting the ability for the entire ecosystem to work with a reliable connectivity model can dramatically boost the efficiency of the entire value chain.

A first exemplary use case is provided in Table 1. In this example, a use case involving field crews performing actual field inspection work, as well as work initiation, is described. Such work may typically be planned and may require a crew to visit a specific set of components on the physical system (e.g., an electric network) in order to validate the components, record specific test results as requested, validate information already known about the components and provide any further observations. The disclosed subject matter may obviate drawbacks such as limited context of the component in its relationship to the power network, its geospatial relationship and any in-field or back-office real-time analytics when performing any of the formerly mentioned actions. Table 1 describes the details including a model-centric synthesis, in accordance with the disclosed subject matter, that is marked in each step.

TABLE 1

| Actor Name | Description of Step |
|---|---|
| Field Crew | The crew starts their workday. The mobile app automatically downloads all their planned work and presents a geospatial view of the locations of the work, the power network and its current known state, locations of emergency services and locations of other crews. The driving directions from their current location to the first work location are shown. [VIEW] |
| SYSTEM | The field crew arrives at the first location. The device automatically indicates the location. If in connected mode, the mobile app constantly provides location information back to host systems for operations. [VIEW] |
| Field Crew | The field crew acknowledges that they are going to proceed with their work. [UPDATE] |
| SYSTEM | The field crew is going to perform a pole inspection. All the information regarding the pole such as type (type, date installed, prior inspection details, etc.) are provided by the crew in both textual dialogs in a spatial view [UPDATE]. The data from relevant sensors e.g. real time reading from devices such as transformers that are attached to the pole, is shown too. [VIEW] |
| Field Crew | The crew repositions the location of the pole based on the current location of the mobile device. This immediately changes the location of the pole in the model view. [UPDATE] |
| Field Crew | The crew notes that the pole is encumbered by vegetation; they take a photo of the pole and the information is saved using the mobile app. [RECORD] |
| Field Crew | The crew performs a pole test and enters results into the appropriate work order. [UPDATE] |
| Advanced Analytics | Based on the result of the pole test, the mobile app performs some analytics based on prior tests and current test results and flags to the crew member that the pole requires immediate replacement. [VALIDATE] |
| Field Crew | The field crew acknowledges the pole defect and signals that the work must be scheduled. [UPDATE] |
| SYSTEM | The mobile app completes the work, sends updates and work request to back end systems, shows the pole with a status of replacement schedule pending. [VIEW] |

A second exemplary use case is provided in Table 2. In this example, a use case involving failure assessment and recovery is described. In this particular scenario, a storm has occurred causing multiple outages. Field crews are dispatched to perform power network assessments to specific portions of the network in an order that prioritizes customer safety, impacted customer volumes and crews locations amongst other variables. The crews' job is to report as soon as possible the results of their assessment to enable analytics to determine the optimal recovery plan. Table 2 describes the use case details including a model-centric synthesis marked in each step, similarly as in Table 1.

TABLE 2

| Actor Name | Description of Step |
|---|---|
| SYSTEM | Network failure has been detected. Based on the extent of the outage (predicted or provided) a storm assessment plan is created. This plan considers: points impacted on the network, types of customers impacted on differing locations of the network (hospitals, commercial, residential), volume of customers, location and number of crews. This assessment then creates malfunction assessment requests to the crews for specific areas of the network. [VIEW] |

TABLE 2-continued

| Actor Name | Description of Step |
|---|---|
| Control Center | The control center views and if required approves the malfunction dispatch order. [UPDATE] |
| Field Crew | The field crew receives the malfunction notification and instructions as to whether they should begin their assessment. [VIEW] |
| SYSTEM | The mobile app shows the network geospatially with all components that require inspection. [VIEW] |
| Field Crew | The crew drives to their first location and walks along the network line, noting all visible defects e.g., switches, re-closures, poles, transformers, lines, secondary connections to homes [UPDATE]. The crew needs only to tap a component on screen and indicate the issue (line down, transformer burnt, switch open, vegetation removal required, etc.) During this time, the mobile app enables to smoothly switch between the physical and the model views, fusing the required data layers to answer the specific need. [VIEW/RECORD] |
| SYSTEM | As the information is collected, it is relayed to the Control Center systems. If there is no network connection it is stored on the mobile device until a connection is acquired. [UPDATE] |
| Control Center | As the defect information is received from the field, it is presented to the control center staff. While connectivity exists in the app, the control center staff will also see the movement of each deployed crew as they progress along the line. [VIEW] |
| Field Crew | When the field crew has fully completed their assessment they indicate that they have completed it and transmit the results to the Control Center. [UPDATE] |
| SYSTEM | As information is received from the various field crews, recovery optimization is executed in real time. This optimization determines an optimal recovery plan based on the following variables: Customers and type impacted, Defects found, Crews and skills available, Crew locations, Equipment required. The generated plan is calculated based on choices and limits defined by the utility; Outage duration, Type of customers, Costs, Time of equipment availability. [VALIDATE] |
| Control Center | The control center staff can accept or adjust plans at any time. The work is either dispatched automatically or manually. [UPDATE] |
| Advanced Analytics | The field crew is provided the list of work, warehouse orders, etc. [VIEW] |
| Field Crew | Receives their work and commences to location. The field crew views the optimization results according to current location and activates context-based simulation to ensure certain restoration. [VIEW] |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
obtaining a model representing a system, wherein the model is a computerized digital model updatable separately from the system, wherein the system is a real world physical system updateable separately from the model;
receiving an indication of a physical component of the system being subject to engagement by a user, wherein the engagement is a physical engagement of the user in a physical world;
automatically determining a model component corresponding to the physical component, wherein said automatically determining comprises mapping the physical component to the model component; and
controlling an interaction of the user with the model component performed via a mobile device operated by the user based on at least one of the model and data obtained through engagement with the physical component.

2. The computer-implemented method of claim 1, wherein the interaction comprises displaying, by the mobile device, one or more characteristics of the model component.

3. The computer-implemented method of claim 1, wherein the interaction comprises defining by the user utilizing a user interface provided by the mobile device, one or more characteristics of the model component.

4. The computer-implemented method of claim 1, wherein the interaction comprises modifying by the user utilizing a user interface provided by the mobile device, one or more characteristics of the model component.

5. The computer-implemented method of claim 1, wherein the interaction comprises simulating on the mobile device a modification to the model resulting from performing on the model component a user action to be performed on the physical component.

6. The computer-implemented method of claim 1, wherein the interaction is performed in real time.

7. The computer-implemented method of claim 1, wherein the indication is selected from the group consisting of: a geo-spatial location; a time of day; a barcode; a Quick Response (QR) Code; a Radio Frequency Identification (RFID) tag; a character sequence; an image; and any combination thereof.

8. The computer-implemented method of claim 1, wherein the mobile device comprises at least one sensor for receiving the indication and/or obtaining data of the physical component, wherein said automatically determining the model component corresponding the physical component is performed based on information received from the at least one sensor.

9. The computer-implemented method of claim 1, further comprising relaying the obtained data by the mobile device to a communication network via which the model is accessible by plurality of mobile devices operated by plurality of users, wherein said relaying is performed in real time to enable synchronization of the model among the plurality of mobile devices.

10. A computerized apparatus having a processor, the processor being adapted to perform the steps of:
obtaining a model representing a system, wherein the model is a computerized digital model updatable separately from the system, wherein the system is a real world physical system updatable separately from the model;

receiving an indication of a physical component of the system being subject to engagement by a user, wherein the engagement is a physical engagement of the user in a physical world;

automatically determining a model component corresponding to the physical component, wherein said automatically determining comprises mapping the physical component to the model component; and controlling an interaction of the user with the model component based on at least one of the model and data obtained through engagement with the physical component.

11. The computerized apparatus of claim 10, wherein the interaction comprises displaying one or more characteristics of the model component to the user.

12. The computerized apparatus of claim 10, further being configured to provide a user interface, wherein the interaction comprises defining, by the user utilizing the user interface, one or more characteristics of the model component.

13. The computerized apparatus of claim 10, further being configured to provide a user interface, wherein the interaction comprises modifying, by the user utilizing the user interface, one or more characteristics of the model component.

14. The computerized apparatus of claim 10, wherein the interaction comprises simulating a modification to the model resulting from performing on the model component a user action to be performed on the physical component.

15. The computerized apparatus of claim 10, wherein the interaction is performed in real time.

16. The computerized apparatus of claim 10, wherein the indication is selected from the group consisting of: a geo-spatial location; a time of day; a barcode; a Quick Response (QR) Code; a Radio Frequency Identification (RFID) tag; a character sequence; an image; and any combination thereof.

17. The computerized apparatus of claim 10, further comprising at least one sensor for receiving the indication and/or obtaining data of the physical component, wherein said processor being further adapted to automatically determine the model component corresponding the physical component based on information received from the at least one sensor.

18. The computerized apparatus of claim 10, wherein said processor being further adapted for relaying the obtained data by the mobile device to a communication network via which the model is accessible by plurality of mobile devices operated by plurality of users, wherein said relaying is performed in real time to enable synchronization of the model among the plurality of mobile devices.

19. The computerized apparatus of claim 10, wherein the computerized apparatus is coupled to or composes of a mobile device being operated by the user and via which the interaction is being performed.

20. A computer program product comprising a non-transitory computer readable storage medium retaining program instructions, which program instructions when read by a processor, cause the processor to perform a method comprising:

obtaining a model representing a system updatable separately from the system, wherein the model is a computerized digital model, wherein the system is a real world physical system updatable separately from the model;

receiving an indication of a physical component of the system being subject to engagement by a user, wherein the engagement is a physical engagement of the user in a physical world;

automatically determining a model component corresponding to the physical component, wherein said automatically determining comprises mapping the physical component to the model component; and controlling an interaction of the user with the model component based on at least one of the model and data obtained through engagement with the physical component.

* * * * *